United States Patent
Wang

(10) Patent No.: US 11,265,808 B2
(45) Date of Patent: Mar. 1, 2022

(54) ADAPTIVE NETWORK SLICE SELECTION

(71) Applicant: Telefonaktiebolaget LM Ericsson (publ), Stockholm (SE)

(72) Inventor: Cheng Wang, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/642,417

(22) PCT Filed: Sep. 25, 2017

(86) PCT No.: PCT/CN2017/103167
§ 371 (c)(1),
(2) Date: Feb. 27, 2020

(87) PCT Pub. No.: WO2019/056365
PCT Pub. Date: Mar. 28, 2019

(65) Prior Publication Data
US 2020/0260371 A1  Aug. 13, 2020

(51) Int. Cl.
*H04W 48/18* (2009.01)
*H04W 8/20* (2009.01)
(Continued)

(52) U.S. Cl.
CPC .............. *H04W 48/18* (2013.01); *H04W 8/20* (2013.01); *H04W 24/08* (2013.01); *H04W 60/00* (2013.01)

(58) Field of Classification Search
CPC ..... H04W 12/06; H04W 12/08; H04W 24/00; H04W 40/24; H04W 40/244;
(Continued)

(56) References Cited

U.S. PATENT DOCUMENTS

| 6,748,434 B2 | 6/2004 | Kavanagh |
| 2003/0055954 A1 | 3/2003 | Kavanagh |

(Continued)

FOREIGN PATENT DOCUMENTS

| CN | 106572516 A | 4/2017 |
| CN | 106657194 A | 5/2017 |
| CN | 107040481 A | 8/2017 |

OTHER PUBLICATIONS

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V1.1.0, Jul. 1, 2017, pp. 1-165, 3GPP.

(Continued)

*Primary Examiner* — Jean A Gelin
(74) *Attorney, Agent, or Firm* — Coats + Bennett, PLLC

(57) ABSTRACT

Disclosed herein is a method and a function entity for selecting a core network slice (NS), for serving a wireless communication device (WCD) 530 in a core network 500 comprising at least one a Management Function (MF) entity 530 serving the WCD 530 and at least one Repository Function (RF) entity (NRF1, NRF2) serving a plurality of core NSs (NSI #1, NSI #2) each comprising a plurality of Network Function (NF) entities the method being performed by a Slice Selection Function (SSF) entity 510 operative in the core network 500, the method comprising: obtaining 612, 616 NSI running status information indicating NSI miming status for each NS to be monitored; receiving 622 a NSI selection request comprising NSI selection information indicating at least one of NS (NSI #1, NSI #2) for serving the WCD and selecting 624, based on the NSI selection information and the NSI running status information, a selected NS (NSI #2) for serving the WCD.

10 Claims, 11 Drawing Sheets

(51) Int. Cl.
*H04W 24/08* (2009.01)
*H04W 60/00* (2009.01)

(58) Field of Classification Search
CPC .............. H04W 40/248; H04W 76/10; H04W 84/005; H04W 84/18; H04W 24/02; H04W 48/18; H04W 88/18; H04L 41/0896; H04L 41/12; H04L 41/5003; H04L 41/5067; H04L 43/045; H04L 45/302; H04L 41/308; H04L 43/08
See application file for complete search history.

(56) References Cited

U.S. PATENT DOCUMENTS

| | | | |
|---|---|---|---|
| 2004/0137915 A1* | 7/2004 | Diener | H04W 24/00 455/456.1 |
| 2017/0070892 A1 | 3/2017 | Song et al. | |
| 2017/0141973 A1 | 5/2017 | Vrzic | |
| 2017/0289791 A1* | 10/2017 | Yoo | H04W 68/005 |
| 2017/0303259 A1* | 10/2017 | Lee | H04W 12/08 |
| 2017/0332421 A1* | 11/2017 | Sternberg | H04W 12/062 |
| 2017/0359768 A1* | 12/2017 | Byun | H04W 8/06 |
| 2017/0374601 A1* | 12/2017 | Braga Ameixieira | H04L 61/6086 |
| 2018/0139107 A1* | 5/2018 | Senarath | H04L 41/5067 |
| 2018/0352491 A1* | 12/2018 | Shih | H04W 8/02 |
| 2019/0037409 A1* | 1/2019 | Wang | H04W 8/08 |
| 2019/0159117 A1* | 5/2019 | Kuge | H04W 36/0022 |
| 2019/0174321 A1* | 6/2019 | Sun | H04W 48/16 |
| 2019/0230584 A1 | 7/2019 | Lou et al. | |
| 2019/0246633 A1* | 8/2019 | Levy-Ruso | A01N 47/34 |
| 2019/0281503 A1* | 9/2019 | Xu | H04L 41/50 |
| 2020/0015158 A1* | 1/2020 | So | H04W 48/18 |
| 2020/0068473 A1* | 2/2020 | Tang | H04W 36/00837 |
| 2020/0112861 A1* | 4/2020 | Yao | H04L 41/0893 |
| 2020/0162345 A1* | 5/2020 | Vaishnavi | H04L 41/04 |

OTHER PUBLICATIONS

3rd Generation Partnership Project, "3rd Generation Partnership Project; Technical Specification Group Services and System Aspects; Study on Architecture for Next Generation System (Release 14)", Technical Report, 3GPP TR 23.799 V14.0.0, Jan. 12, 2016, pp. 1-522, 3GPP.

3rd Generation Partnership Project, "3rd Generation Partnership Project; Technical Specification Group Services and System Aspects; Telecommunication Management; Study on Management and Orchestration of Network Slicing for Next Generation Network (Release 15)", Technical Report, 3GPP TR 28 801 V2.0.1, Sep. 1, 2017, pp. 1-78, 3GPP.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V1.3.0, Sep. 1, 2017, pp. 1-176, 3GPP.

Telecom Italia, "23.502: NSI Selection per UE", SA WG2 Meeting #122bis, Sophia Antipolis, France, Aug. 21, 2017, pp. 1-4, S2-175609, 3GPP.

Huawei et al., "UE Slice Association/Overload Control Procedure", 3GPP TSG SA WG2 Meeting #115, Nanjing, China, May, 23, 2016, pp. 1-8, S2-162981, 3GPP.

* cited by examiner

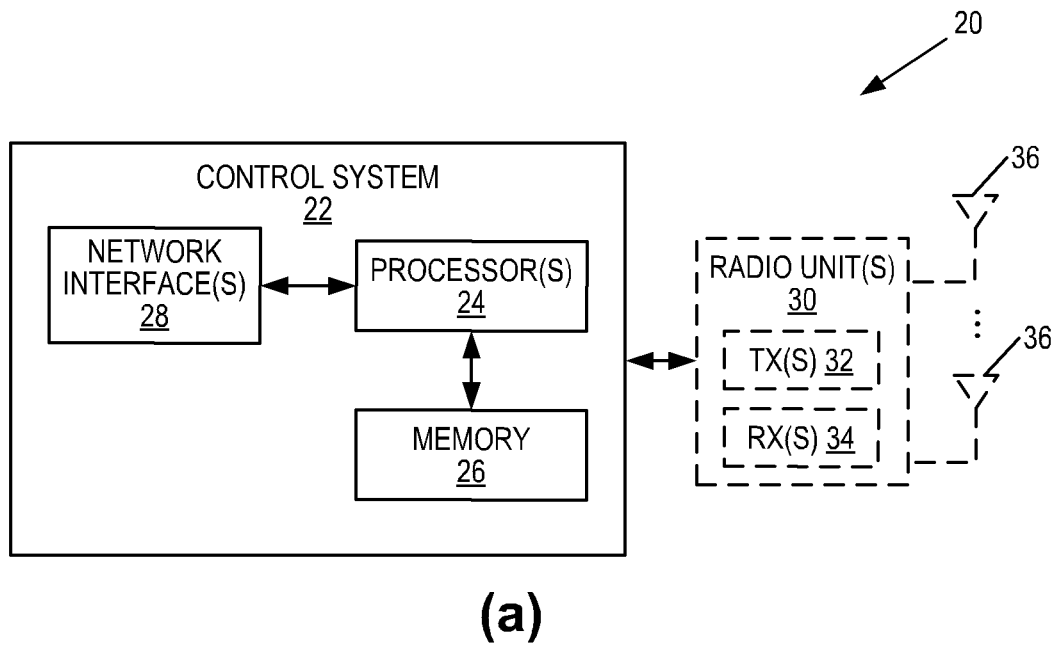
(a)
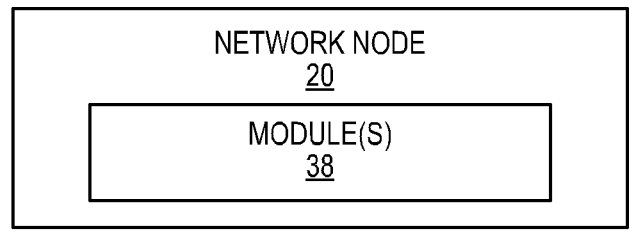
(b)
Fig 9

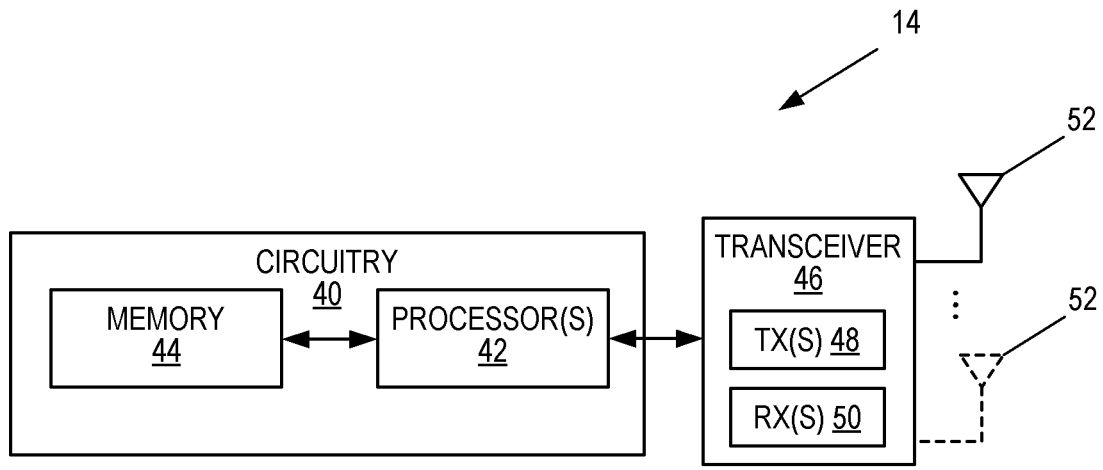
(a)
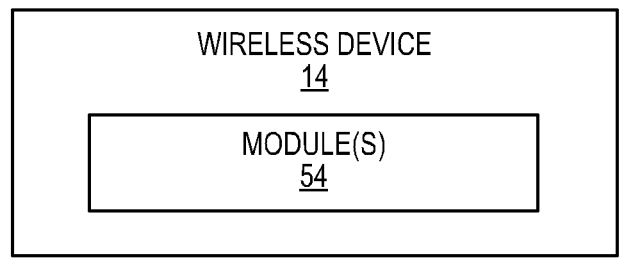
(b)
Fig 11

ADAPTIVE NETWORK SLICE SELECTION

TECHNICAL FIELD

The present disclosure relates to methods and functions for selecting a core network slice for serving a wireless communication device in a wireless communication system.

BACKGROUND

In Fifth Generation (5G) networks, a Network Slice is introduced as a logical network that provides specific network capabilities and network characteristics. An instance of a network slice (e.g. a network slice instance, NSI) is a set of Network Function (NF) instances and the required resources (e.g., compute, storage, and networking resources) which form a deployed Network Slice. A NF is a 3GPP adopted or 3GPP defined processing function in a network, which has defined functional behaviour and 3GPP defined interfaces. A NF can be implemented either as a network element on dedicated hardware, a software instance funning on a dedicated hardware, or as a virtualized functional instantiated on an appropriate platform, e.g., on a cloud infrastructure.

The network slicing concept is used to fulfill rich requirements from various 5G use cases. Various network services with different characteristics can be exposed to third party applications/users/operators as capabilities to enable various new business models. A specific network service can be instantiated in a Network Slice (NS) by means of one or more NFs according to on demand requirements for third party users/operators and the business policy between the network service providers and network the service consumers.

It is expected that there will be many different types of NSs for different usages in future. The relation between specific usage and the network service with special characteristics may be dynamic and flexible to support flexible/agile business model. For example, during initial period of special usage, it is possible that special usage traffic is still served by a common network and/or a common NS for basic network service. With the increased numbers of special users or VIP users, a dedicated network service is instantiated in a dedicated NS to support required features and enable the flexible business model. In addition, as mentioned by 3GPP, usually one default core NS is associated with one or more dedicated core NSs. In case the dedicated core network for the usage is not available or if there is insufficient information for selecting a dedicated NS, a special usage UE can be directed to the default core NS for basic network service, or steered to a dedicated core NS using serving operator specific policies.

In the 5G core network, the core network slice isolation requirement requires that the Network Slice Selection Function (NSSF) is a single function across all core Network Slices (NSs). With regarding to the NF Repository Function (NRF), a layered NRF structure is defined in 3GPP to assist the NF routing information (e.g. address resolution) in each specific isolated domain. The NSSF is used to select and decide the Network Slice Instances (NSIs) that serves a UE for a specific network service.

SUMMARY

It is noted that the existing method for selecting a Network Slice (NS) for serving a Wireless Communication Device (WCD), e.g. such as a UE, does not consider the availability etc. of a requested or desired NS, particularly not during the slice selection stage. Hence a UE may suffer service disruption in later stage e.g. when setting up a Packet Data Unit (PDU) connection when the Session Management Function (SMF) or User Plane Function (UPF) resources within the selected NS is exhausted. Typically, the availability etc. depends on the running status of the requested or desired NS. Thus, a question is how the running status of potential NSs should be monitored, obtained and taken into account during a NS selection procedure?

One embodiment accomplishes at least a part of this by being directed to a method for selecting a core NS for serving a WCD in a core network comprising at least one Management Function (MF) entity serving the WCD and at least one Repository Function (RF) entity serving a plurality of core NSs each comprising a plurality of Network Function (NF) entities. The method being performed by a Slice Selection Function (SSF) entity operative in the core network, the method comprising:
  obtaining NSI-running-status information indicating NSI-running-status for each NS to be monitored;
  receiving a NSI-selection request comprising NSI-selection information indicating at least one of NS for serving the WCD;
  selecting, based on the NSI-selection information and the NSI-running-status information, a selected NS for serving the WCD.

Another embodiment accomplishes at least a part of this by being directed to a Slice Selection Function (SSF) entity configured to operatively select a core Network Slice (NS) for serving a wireless communication device (WCD) in a core network, which core network comprises at least one Management Function (MF) entity for serving the WCD and at least one Repository Function (RF) entity for serving a plurality of core NSs each comprising a plurality of Network Function (NF) entities; where said SSF entity comprises at least one processor and memory comprising instructions executable by the at least one processor whereby the SSF entity is operable to:
  obtain NSI-running-status information indicating NSI-running-status for each NS to be monitored;
  receive a NSI-selection request comprising NSI-selection information indicating at least one of NS for serving the WCD;
  select, based on the NSI-selection information and the NSI-running-status information, a selected NS for serving the WCD.

Another embodiment accomplishes at least a part of this by being directed to a method for selecting a core Network Slice (NS) for serving a wireless communication device (WCD) in a core network comprising a plurality of core NSs, each comprising a plurality of Network Function (NF) entities, the method being performed by a Management Function (MF) entity operative in the core network, the method comprising:
  receiving a registration request originating from the WCD 530, which registration request comprises requested NSI-selection information indicating one or more requested NSIs for serving the WCD;
  sending a NSI-selection request towards a Slice Selection Function (SSF) entity, which NSI-selection request comprises NSI-selection information indicating at least one NS for serving the WCD 530;
  receiving a NSI-selection response comprising NSI-selection-information indicating a selected NS for serving the WCD.

Another embodiment accomplishes at least a part of this by being directed to a Management Function (MF) entity configured to operatively select a core Network Slice (NS) for serving a wireless communication device (WCD) in a core network, which core network comprises a plurality of core NSs, each comprising a plurality of Network Function, (NF) entities; where said MF entity comprises at least one processor and memory comprising instructions executable by the at least one processor whereby the MF entity (500) is operable to:

receive a registration request originating from the WCD, which registration request comprises requested NSI-selection information indicating one or more requested NSIs for serving the WCD;

send a NSI-selection request towards a Slice Selection Function (SSF) entity, which NSI-selection request comprises NSI-selection information indicating at least one NS for serving the WCD;

receive a NSI-selection response comprising NSI-selection-information indicating a selected NS for serving the WCD.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 9a is a schematic block diagram of a network node/function (e.g., a AMF, a UPF, a NRF, a UDM, a AUSF, a RAN node, etc.) according to some embodiments of the present disclosure;

FIG. 9b is a schematic block diagram of a network node/function according to some embodiments of the present disclosure;

FIG. 11a is a schematic block diagram of a wireless communication device according to some embodiments of the present disclosure;

FIG. 11b is a schematic block diagram of a wireless communication device according to some other embodiments of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Figure 1:
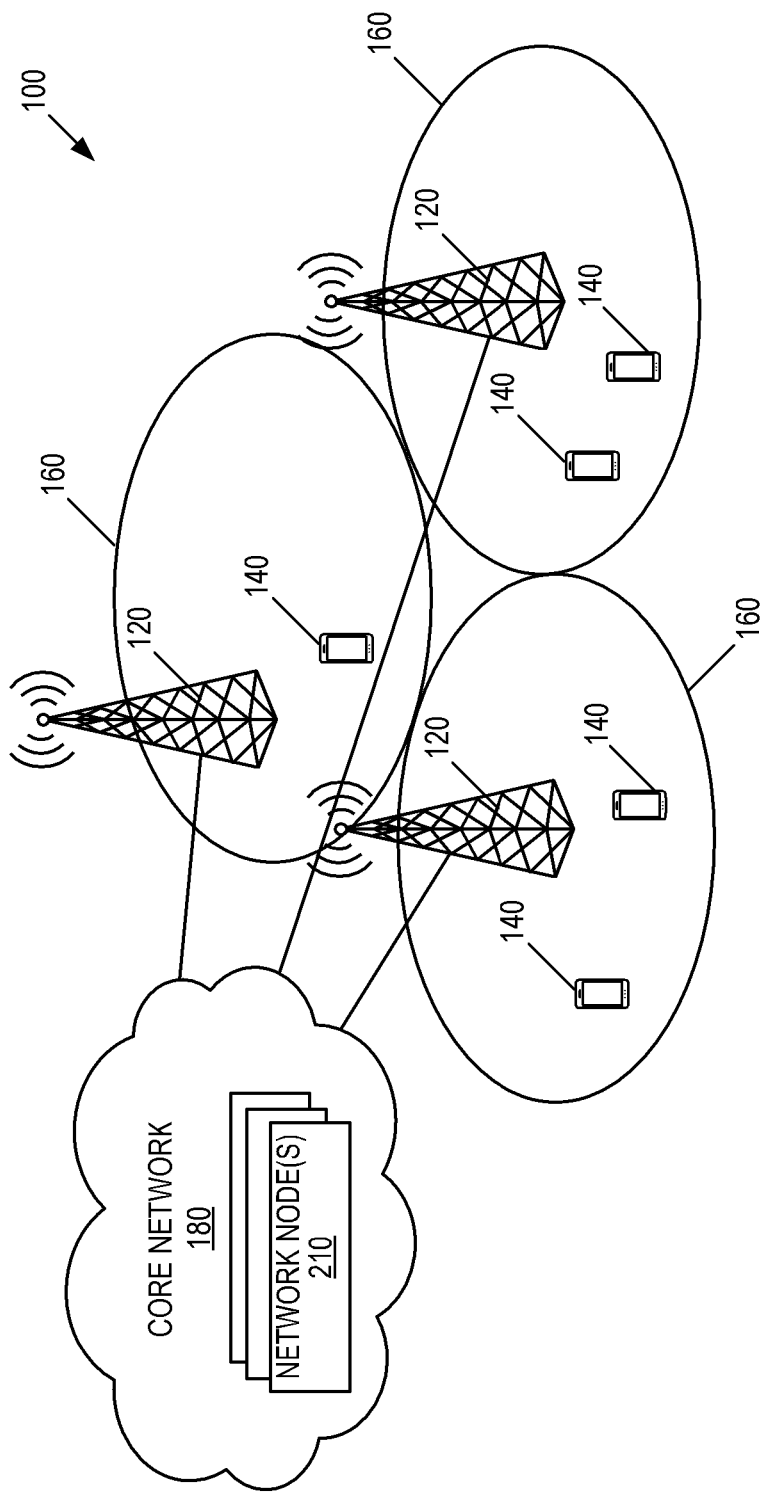
FIG. 1 illustrates an exemplary wireless communication system in which some embodiments of the present disclosure can be implemented.

FIG. 1 illustrates one example of a wireless communication system 100 in which embodiments of the present disclosure may be implemented. The wireless communication system 100 may be a cellular communications system such as, for example, a 5G New Radio (NR) network or an LTE cellular communications system. As illustrated, in this example, the wireless communication system 100 includes a plurality of radio access nodes 120 (e.g., eNBs, 5G base stations which are referred to as gNBs, or other base stations or similar) and a plurality of wireless communication devices 140 (e.g., conventional UEs, Machine Type Communication (MTC)/Machine-to-Machine (M2M) UEs). The wireless communication system 100 is organized into cells 160, which are connected to a core network 180 via the corresponding radio access nodes 120. The radio access nodes 120 are capable of communicating with the wireless communication devices 140 (also referred to herein as wireless communication device 140 or UEs 140) along with any additional elements suitable to support communication between wireless communication devices or between a wireless communication device and another communication device (such as a landline telephone). The core network 180 includes one or more network node(s) or function(s) 210. In some embodiments, the network nodes/functions 210 may comprise, for example, any of the network functions shown in FIGS. 2-3.

Figure 2:
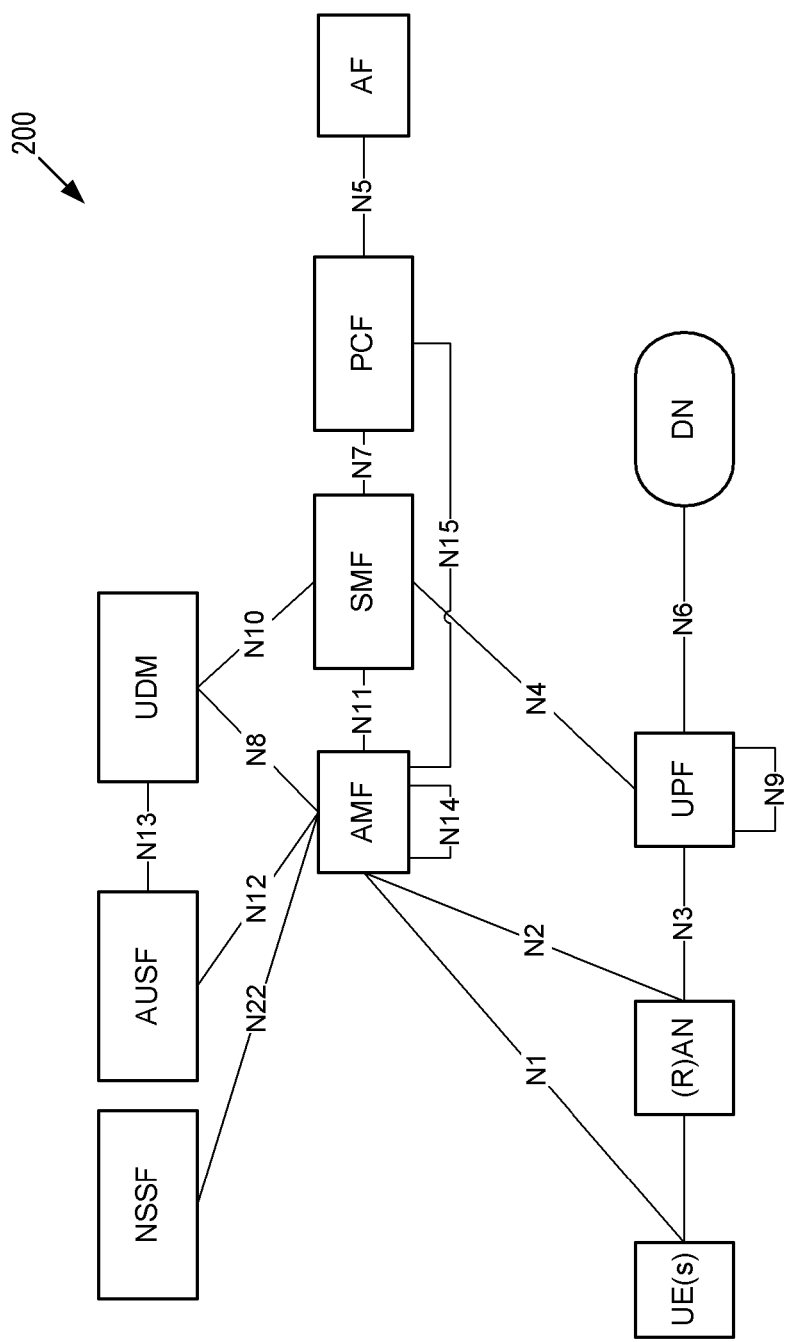
FIG. 2 illustrates a 5G network architecture using point-to-point reference points/interfaces, in which architecture some embodiments of the present disclosure can be implemented.

FIG. 2 illustrates a wireless communication system 200 represented as a 5G network architecture composed of core Network Functions (NFs), where interaction between any two NFs is represented by a point-to-point reference point/interface.

Seen from the access side the 5G network architecture shown in FIG. 2 comprises a plurality of User Equipment (UEs) connected to either a Radio Access Network (RAN) or an Access Network (AN) as well as an Access and Mobility Management Function (AMF). Typically, the R(AN) comprises base stations, e.g. such as evolved Node Bs (eNBs) or 5G base stations (gNBs) or similar. Seen from the core network side, the 5G core NFs shown in FIG. 2 include a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF).

Reference point representation of the 5G network architecture are used to develop detailed call flows in the normative standardization. The N1 reference point is defined to carry signaling between UE and AMF. The reference points for connecting between AN and AMF and between AN and UPF are defined as N2 and N3, respectively. There is a reference point, N11, between AMF and SMF, which implies that SMF is at least partly controlled by AMF. N4 is used by SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since PCF applies policy to AMF and SMP, respectively. N12 is required for the AMF to perform authentication of the UE. N8 and N10 are defined because the subscription data of UE is required for AMF and SMF.

The 5G core network aims at separating user plane and control plane. The user plane carries user traffic while the control plane carries signaling in the network. In FIG. 2, the UPF is in the user plane and all other NFs, i.e., AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
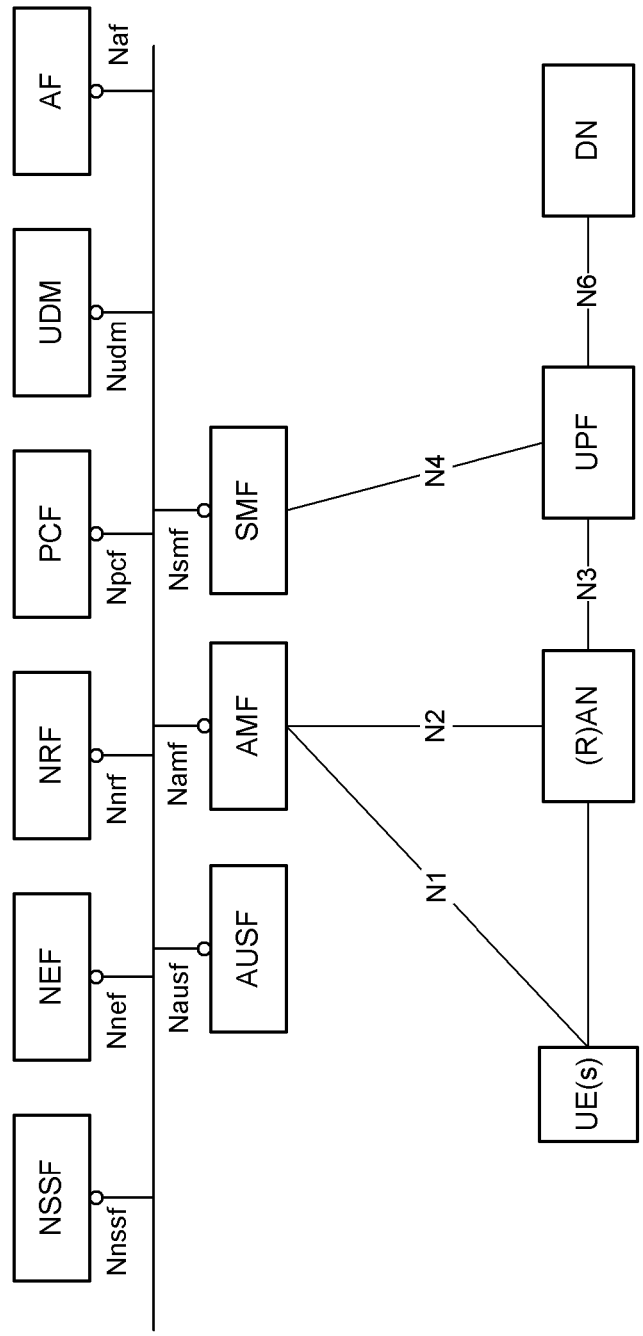
FIG. 3 illustrates a 5G network architecture using service-based interfaces, in which architecture some embodiments of the present disclosure can be implemented.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service-based interfaces are indicated by the letter "N" followed by the name of the NF, e.g. Namf for the service-based interface of the AMF and Nsmf for the service-based interface of the SMF etc. The Network Exposure Function (NEF) and the Network Repository Function (NRF) in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2-3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates IP addresses to UEs. It also selects and controls the UPF for data transfer. If a UE has multiple sessions, different SMFs may be allocated to each session to manage them individually and possibly provide different functionalities per session. The AF provides information on the packet flow to PCF responsible for policy control in order to support Quality of Service (QoS). Based on the information, PCF determines policies about mobility and session management to make AMF and SMF operate properly. The AUSF supports authentication function for UEs or similar and thus stores data for authentication of UEs or similar while UDM stores subscription data of UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 5:
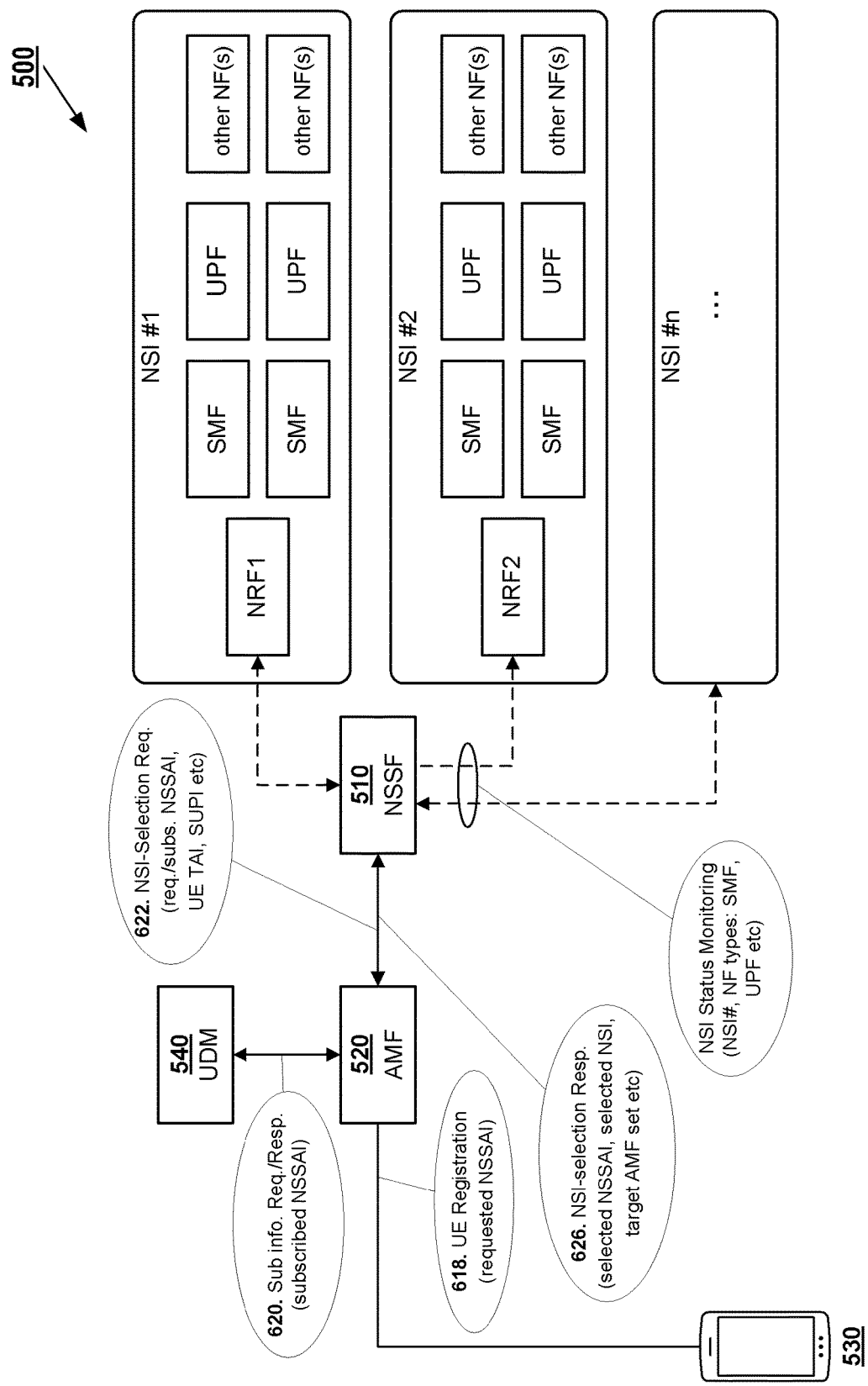
FIG. 5 is schematic illustration of a method for selecting a core Network Slice Instance (NSI) for serving a wireless communication device (WCD)
Figure 6:
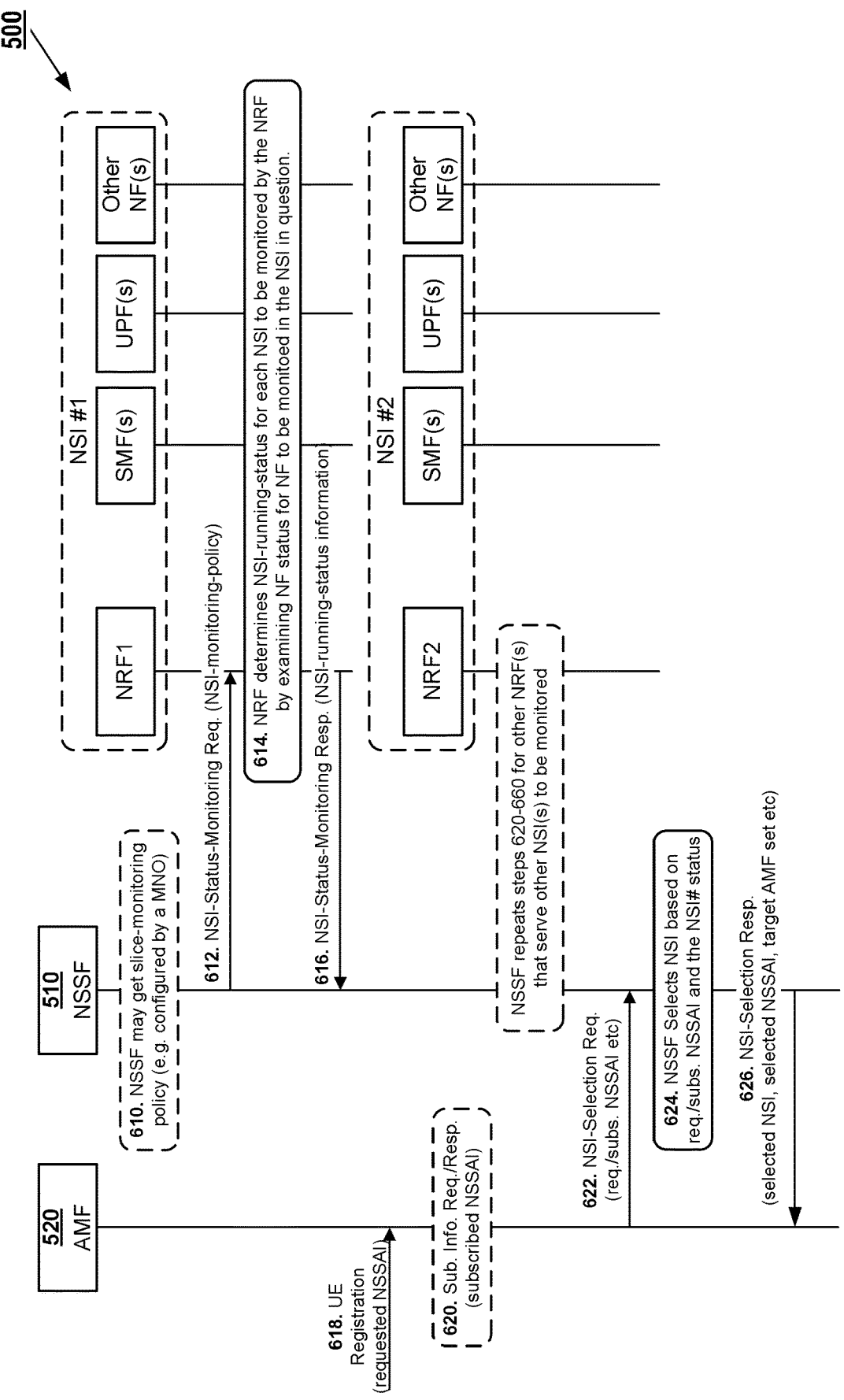
FIG. 6 is an exemplifying signalling diagram illustrating more details of the method in FIG. 5.

The Network Slice Selection Function (NSSF) shown in FIGS. 2-3 is an example of a Slice Selection Function that is configured to operatively select a network slice instance (NSI) or similar in the core network for serving a UE or similar. The NSI selection is preferably done based on Network Slice Selection Assistance Information (NSSAI) associated with a session requested by and/or for a UE or similar. In addition, the NSI selection may be based on other parameters such as e.g. Data Network Name (DNN) associated with the requested session and possibly UE subscription data etc. However, the particular NSSF 510 shown in FIGS. 5-6 is further configured according to embodiments of the present solution to operatively select a NSI for serving a wireless communication device (e.g. a UE) based on the running status of a number of relevant NSIs or similar, as will be further described below with reference to FIGS. 5-6.

Preferably, the Network Slice Selection Assistance Information (NSSAI) comprises selection assistance parameters that can be used by the NSSF 510 or similar when selecting a NSI for serving the UE or similar with respect to a session requested by the UE or similar. The NSSAI may be a collection of Single Network Slice Selection Assistance Information (S-NSSAIs). There may be a maximum number S-NSSAIs in a NSSAI that is sent in a signalling message from a UE or similar towards the core network.

An S-NSSAI may e.g. comprise at least one of:
A Slice/Service type (SST), which refers to the expected Network Slice behaviour in terms of features and services;
A Slice Differentiator (SD), which is optional information that complements the Slice/Service type(s) to differentiate amongst multiple Network Slices of the same Slice/Service type.

The Network Repository Function (NRF) shown in FIGS. 2-3 is an example of a Repository Function (RF) that is configured to operatively support service discovery functions etc. In particular, the NRF (or similar RF) is configured to operatively maintain relevant information of NF instances served by the NRF, e.g. such as at least one of the:
NF instance ID
NF type
PLMN ID (i.e. Public Land Mobile Network ID)
Network Slice related Identifier(s) e.g. S-NSSAI, NSI ID
FQDN or IP address of NF
NF capacity information
Names of supported services Endpoint information of instance(s) of each supported service Other service parameter, e.g., DNN In the context of Network Slicing, based on network implementation, multiple NRFs can be deployed at different levels:

Public Land Mobile Network (PLMN) level (the NRF is configured with information for the whole PLMN), shared-slice level (the NRF is configured with information belonging to a set of Network Slices), slice-specific level (the NRF is configured with information belonging to an S-NSSAI).

When deploying a NF instance, the management system (e.g. the Operations and Maintenance (O&M) system) or similar of the network provides the information of the NF instance (e.g. NF type etc.) to the NRF. When the information of the NF instance is changed by the management system or similar provides the changed information to the NRF serving the NF. When the NF instance is removed, the management system or similar deletes the corresponding information of the NF instance in the NRF. However, the particularly Repository Functions (NRF1, NRF2) shown in FIGS. 5-6 are further configured according to embodiments of the present solution to operatively determine the running status for one or more NSI(s) served by the NRF in question and then to report the running status(es) to the Service Selection Function 500, as will be further described below with reference to FIGS. 5-6.

Figure 4:
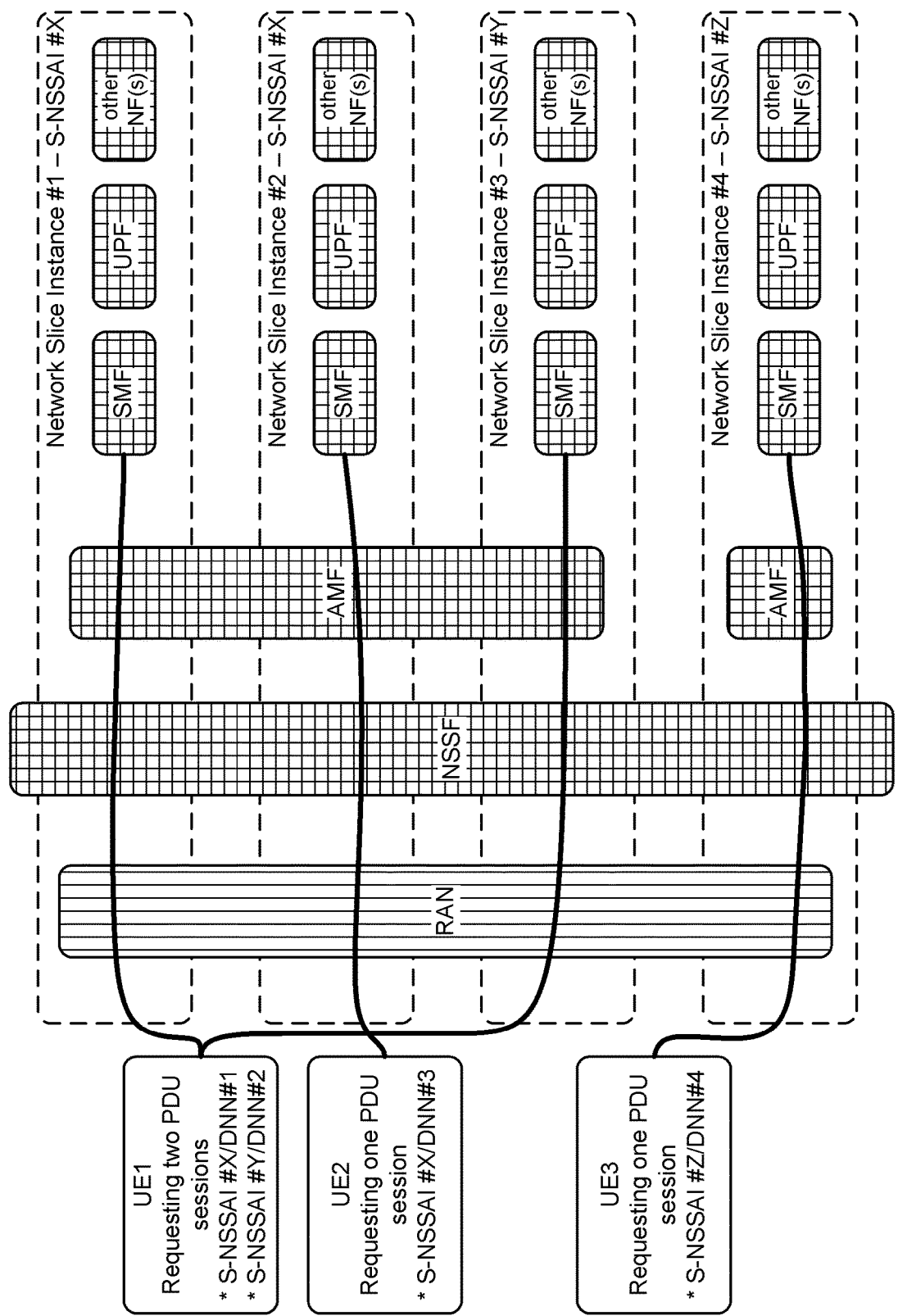
FIG. 4 is a schematic illustration of a relationship between S-NSSAI, NSI and NF

FIG. 4 is a schematic illustration of a relationship between S-NSSAI, NSI and NF. As can be seen in FIG. 4, one S-NSSAI can be supported by multiple NSIs. Further, as can be seen, a NSI typically consist of multiple NFs, possibly with multiple instances such that several NFs of the same type are instantiated in the NSI. The NFs are defined as per 3GPP to fulfil certain functional behaviours. Different set of NFs within one NSI then correspond to various network services with different characteristics. Note, even though no NRF is shown in the figure, as per the definition of TS 23.501, it can be expected that some networks may have one NRF deployed in the same domain as the NSSF, i.e. served at Public Land Mobile Network (PLMN) level, while other networks may have one or several NRF deployed within each NSI, i.e. at slice specific level.

FIG. 5 shows an exemplifying layout schematically illustrating a method for selecting a core Network Slice Instance (NSI) for serving a wireless communication device (WCD) 530 (e.g. such as UE1, UE2 or UE3) in a core network 500. The core network 500 comprises a plurality of core network slice instances (NSIs), e.g. NSI #1, NSI #2 to NSI # n. Each NSI comprises a plurality of Network Functions (NFs), e.g. such as SMF(s) and/or UPF(s) etc. The method is partly performed by a Slice Selection Function (SSF) 510, e.g. a Network Slice Selection Function (NSSF) and partly by a Management Function (MF) 520, e.g. an Access and Mobility Management Function (AMF), both operative in the core network 500.

FIG. 6 shows an exemplifying signalling diagram illustrating details of the method schematically illustrated in FIG. 5. The method comprises:

Action 610. The SSF 510 may obtain slice-monitoring policy. In some embodiments, this action may be optional. The slice-monitoring policy may indicate the NSIs to be monitored and possibly also the NRF(s) or similar serving the indicated NSIs. It is preferred that the slice-monitoring policy indicates how the NSIs shall be monitored, e.g. indicates the NF types to be monitored in the NSI and/or that the number of NFs (e.g. number of NFs in general or only number of NFs of a particular type or particular types) currently instantiated in the NSI should be monitored and/or that the work load status per NF in the NSI (e.g. workload of NFs in general or only workload of NFs of a particular type or particular types) should be monitored.

The work load status may e.g. correspond to a Key Performance Indicator (KPI). The KPI may e.g. indicate at least one of the following NF properties: the accessibility of the NF, the retainability of the NF, the integrity of the NF, the availability of the NF and/or the mobility performance of the NF.

For example, the SSF 510 may be locally configured with slice-monitoring policy. For example, the SSF 500 may obtain slice-monitoring policy from a subscription data management function e.g. such as an Unified Data Management (UDM) 540 or a similar data base function in the core network 500 containing slice-monitoring policy. It is preferred that the slice-monitoring policy is configured by a Mobile Network Operator (MNO) or similar operating at least a part of the core network 500.

Action 612. The SSF 510 sends a NSI-monitoring request towards one or more NRFs or similar serving the NSIs to be monitored. In the example shown in FIGS. 5-6 it is assumed that the SSF 500 sends a first NSI-monitoring request towards a first NRF1 serving a first NSI #1 and a second NSI-monitoring request towards a second NRF2 serving a second NSI #2. However, other embodiments may have only one NRF that serves all NSIs to be monitored. Moreover, some other embodiments may have two (2) or more NRFs that together serve all the NSIs to be monitored. Each NRF may serve a separate subset of the NSIs to be monitored. Each separate subset may comprise one or more NSIs to be monitored. Typically it is sufficient to send one NSI-monitoring request towards each NRF that serve at least one NSI to be monitored, e.g. a separate request to each NRF or a common request to each NRFs.

Preferably, the NSI-monitoring requests are at least partly based on the slice-monitoring policy obtained in Action 610. Thus, it is preferred that the NSI-monitoring request indicates the NSI or NSIs to be monitored by the receiving NRF. Also, the NSI-monitoring request may comprise NSI-monitoring policy to be applied to the NSI(s) that shall be monitored by the receiving NRF. Preferably, the NSI-monitoring policy is at least partly based on the slice-monitoring policy obtained in Action 610. Thus, the NSI-monitoring-policy may indicate how the NSIs shall be monitored, e.g. indicate the NF types to be monitored and/or that the number of NFs (e.g. number of NFs in general or only number of a particular NF type or particular NF types) currently instantiated in the NSI should be monitored and/or that the work load status per NF in the NSI (e.g. workload of NFs in general or only workload of a particular NF type or particular NF types) should be monitored.

Action 614. Each NRF determines, based on the received NSI-monitoring policy and/or based on a locally configured default NSI-monitoring policy, a NSI-running-status for each NSI to be monitored by the NRF in question. In particular, the default NSI-monitoring policy may be used in case no NSI-monitoring policy is received by a NRF. For example, the determining may be done by the NRF requesting the relevant information from the relevant NFs served by the NRF in question, whereupon the NFs respond as requested. The NSI-running status may e.g. comprise the number of NFs currently instantiated in the NSI, e.g. number of NFs in general or the number of NFs of a particular type or particular types, e.g. as indicated by the NSI-monitoring policy. Alternatively or additionally, the NSI-running status may comprise the work load status per NF in the NSI, e.g. workload of NFs in general or only the workload of a particular NF type or particular NF types, e.g. as indicated by the NSI-monitoring policy.

Action 616. Each NRF that receives a NSI-monitoring request in Action 614 sends a NSI-monitoring response towards the SSF 510, which is received by the SSF 510. The NSI-monitoring response(s) comprises NSI-running-status information indicating the NSI-running-status for each NSI that is monitored by the NRF in question. The NSI-running status may e.g. comprise the number of NFs currently instantiated in the NSI, e.g. number of NFs in general or the number of NFs of a particular type or particular types. Alternatively or additionally, the NSI-running status may comprise the work load status per NF in the NSI, e.g. the workload of NFs in general or only the workload of a particular NF type or particular NF types.

In the example of FIGS. 5-6 it is assumed that the SSF 500 receives a first NSI-monitoring response from a first NRF1 serving a first NSI #1 and a second NSI-monitoring response from a second NRF2 serving a second NSI #2. Typically one NSI-monitoring response is received from each NRF that serve at least one NSI to be monitored. Each NRF may serve a separate subset of the NSIs to be monitored. Each separate subset may comprise one or more of the NSIs to be monitored. However, other embodiments may have only one NRF that serves all NSIs to be monitored, whereby only one NSI-status response is received by the SSF 510.

Action 618. The MF 520 receives a registration request originating from the WCD 530 or similar. It is preferred that the registration request comprises requested NSI-selection information—e.g. requested Network Slice Selection Assistance Information (NSSAI) or requested Single NSSAI (S-NSSAI) or similar—indicating one or more requested NSI(s) for serving the WCD, e.g. indicating a type of NF requested by the WCD 530.

Action 620. The MF 520 may obtain subscribed NSI-selection information for the WCD 530, indicating one or more subscribed NSI(s) for serving the WCD. In some embodiments, this action may be optional. Preferably, the subscribed NSI-selection information comprises a subscribed NSSAI or subscribed S-NSSAI or similar indicating one or more subscribed NSI(s) for serving the WCD 530, e.g. indicating the type of NF associated with the subscription for the WCD 530, which NF type may be instantiated by one or more of monitored NSIs. The subscription information may be preconfigured in the MF 520. However, it is preferred that the MF 520 obtains the subscription information from the core network 500, preferably from a subscription data management function, e.g. such as the UDM 540 or similar. This may be done by sending a subscription information request to the UDM or similar, and then receiving a subscription information reply comprising the subscription information from the UDM or similar. It is preferred that the subscription information is configured by a Mobile Network Operator (MNO) or similar operating at least a part of the core network 500.

Action 622. The MF 520 sends a NSI-selection request towards the SSF 510, which is received by the SSF 510. The NSI-selection request comprise NSI-selection information indicating one or more NSI(s) or similar for serving the WCD 530, e.g. indicating the type or types of NSIs or similar for serving the WCD 530. Preferably, the NSI-selection information indicates at least one of: 1) one or more requested NSI(s); 2) one or more subscribed NSI(s). Preferably, the NSI-selection information comprises the requested NSSAI or the subscribed NSSAI. In some embodiments the NSI-selection information comprises the requested S-NSSAI or the subscribed S-NSSAI. In some embodiments, the NSI-selection information comprises both the requested NSSAI and the subscribed NSSAI, or both the requested S-NSSAI and the subscribed S-NSSAI. The NSI-request may comprise further information, e.g. such as the identity or similar of the WCD that originally sent the registration request towards the MF 520 in action 618 above.

Action 624. The SSF 520 selects a selected NSI for serving the WCD 530 based on the NSI-selection information and the NSI-running-status information. Thus, a requested NSI (e.g. indicated by requested NSSAI/S-NSSAI) or a subscribed NSI (e.g. indicated by subscribed NSSAI/S-NSSAI) indicated by the NSI-selection information is preferably selected for serving the WCD 530. Similarly, a NSI for serving the WCD 530 is preferably selected based on the NSI-running-status information, e.g. based on the:

types of NFs available in the NSIs that are monitored;
number of NFs in general or of a certain type that are instantiated in the NSIs that are monitored;
work load status per NF in general or per NF of a certain type that are instantiated in the NSIs that are monitored etc.

For example, if there is a NSI among the monitored NSIs that corresponds to a requested NSI or a subscribed NSI and if this NSI fulfils the criteria applied with respect to the NSI-running-status information, then it is preferred that this NSI is selected for serving the WCD 530. Should there be two (2) or more such NSIs among the monitored NSIs, then a selection among those will be done based on further criteria. Should there be no NSI among the monitored NSIs that corresponds to a requested NSI or a subscribed NSI, then a selection among may perhaps be done among the other monitored NSIs provided that they fulfil the criteria applied with respect to the NSI-running-status information.

Action 626. The SSF 510 sends a NSI-selection response towards the MF 520 serving the WCD 530, which is received by the MF 520. The response comprises NSI-selection information indicating a selected NSI (e.g. NSI #2) for serving the WCD 530. In addition, the NSI-selection information may comprise a selected NSSAI or selected S-NSSA. Preferably, the selected NSSAI/S-NSSAI is a result of the requested NSSAI/S-NSSAI or the subscribed NSSAI/S-NSSAI. Alternatively or additionally, the NSI-selection information may comprise any part of the NSI-running-status information received in Action 616 for the selected NSI, e.g. the number (e.g. one or more) of a certain NF type currently instantiated in the selected NSI etc.

Figure 7:
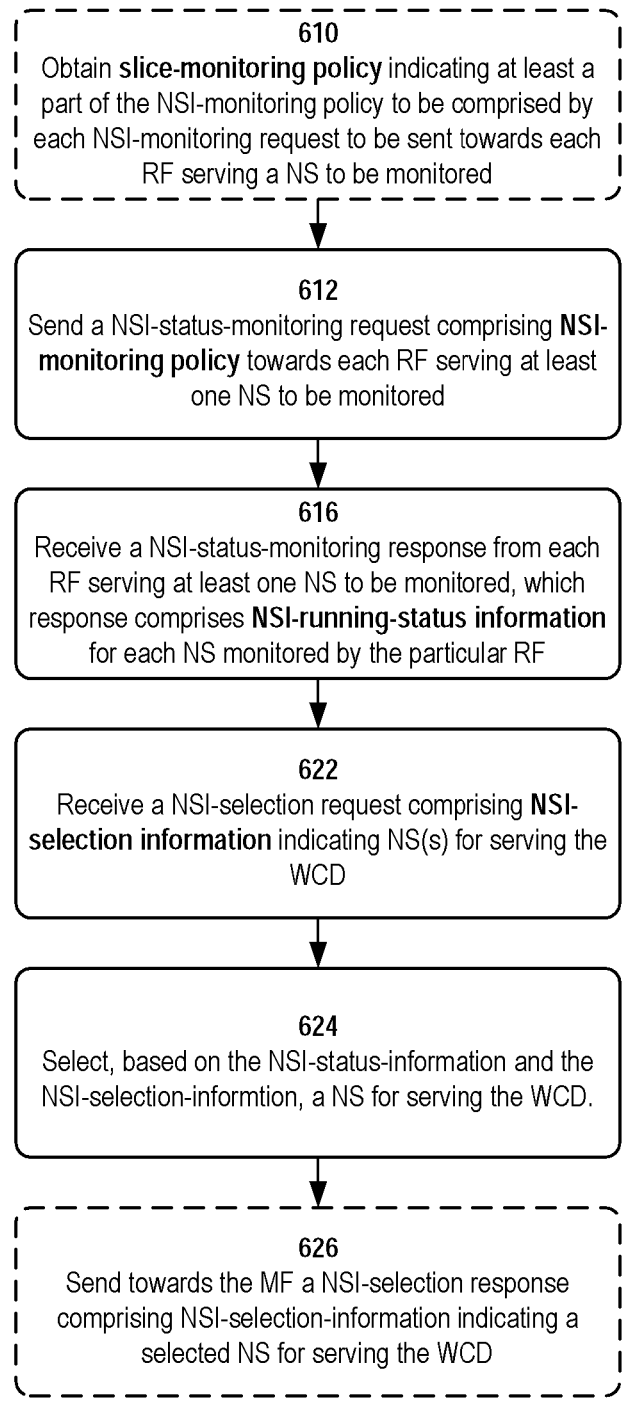
FIG. 7 is flowchart illustrating actions performed by the SSF 510, as illustrated in FIGS. 5-6.

FIG. 7 is a flowchart illustrating action 610, 612, 616, 622 as performed by the SSF 510, e.g. in the form of a NSSF. These actions correspond to the actions with the same reference number 610, 612, 616, 622 described above with reference to FIGS. 5-6.

Figure 8:
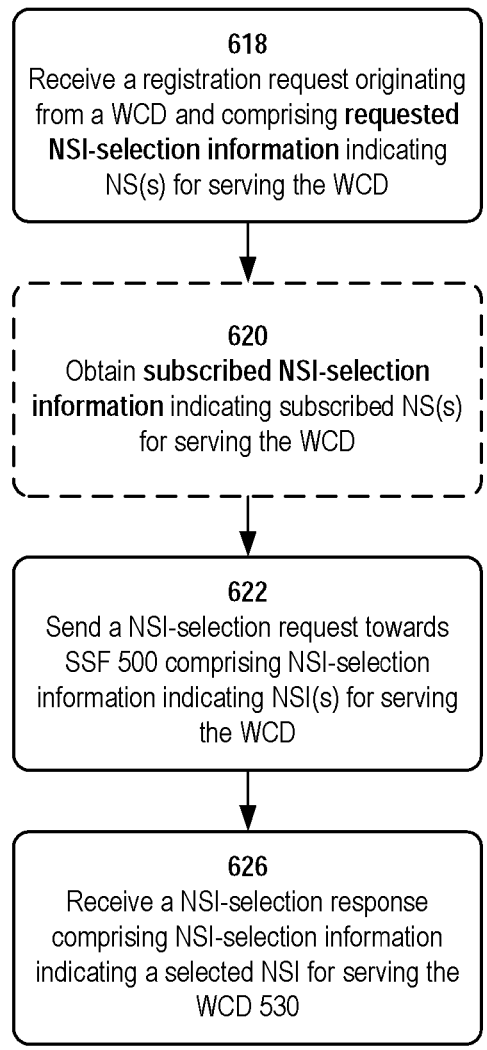
FIG. 8 is flowchart illustrating actions performed by the MF 520 as illustrated in FIGS. 5-6.

FIG. 8 is a flowchart illustrating action 618, 620, 622, 626 performed by the MF 520, e.g. in the form of an AMF. These actions correspond to the actions with the same reference number 618, 620, 622, 626 described above with reference to FIGS. 5-6.

FIG. 9a is a schematic block diagram of a network function 20 (e.g., core network function such as a NSSF, a AMF, a UPF, a NRF, a UDM, a AUSF or a radio access network function such as a RAN function, etc.) according to some embodiments of the present disclosure. As illustrated, the network function 20 includes a control system 22 that includes circuitry comprising one or more processors 24 (e.g., Central Processing Units (CPUs), Application Specific Integrated Circuits (ASICs), Digital Signal Processors (DSPs), Field Programmable Gate Arrays (FPGAs), and/or the like) and memory 26. In the embodiment illustrated in FIG. 9*a*, the control system 22 also includes a network interface 28. In embodiments in which the network function 20 is a RAN, the network function 20 also includes one or more radio units 30 that each include one or more transmitters 32 and one or more receivers 34 coupled to one or more antennas 36. In some embodiments, the functionality of the network function 20 described above may be fully or partially implemented in software that is, e.g., stored in the memory 26 and executed by the processor(s) 24.

FIG. 9*b* is a schematic block diagram of a network function 20 according to some other embodiments of the present disclosure. In this embodiment, the network function 20 includes one or more modules 38, each of which is implemented in software. The module(s) 38 provide the functionality of the network function 20 described herein.

Figure 10:
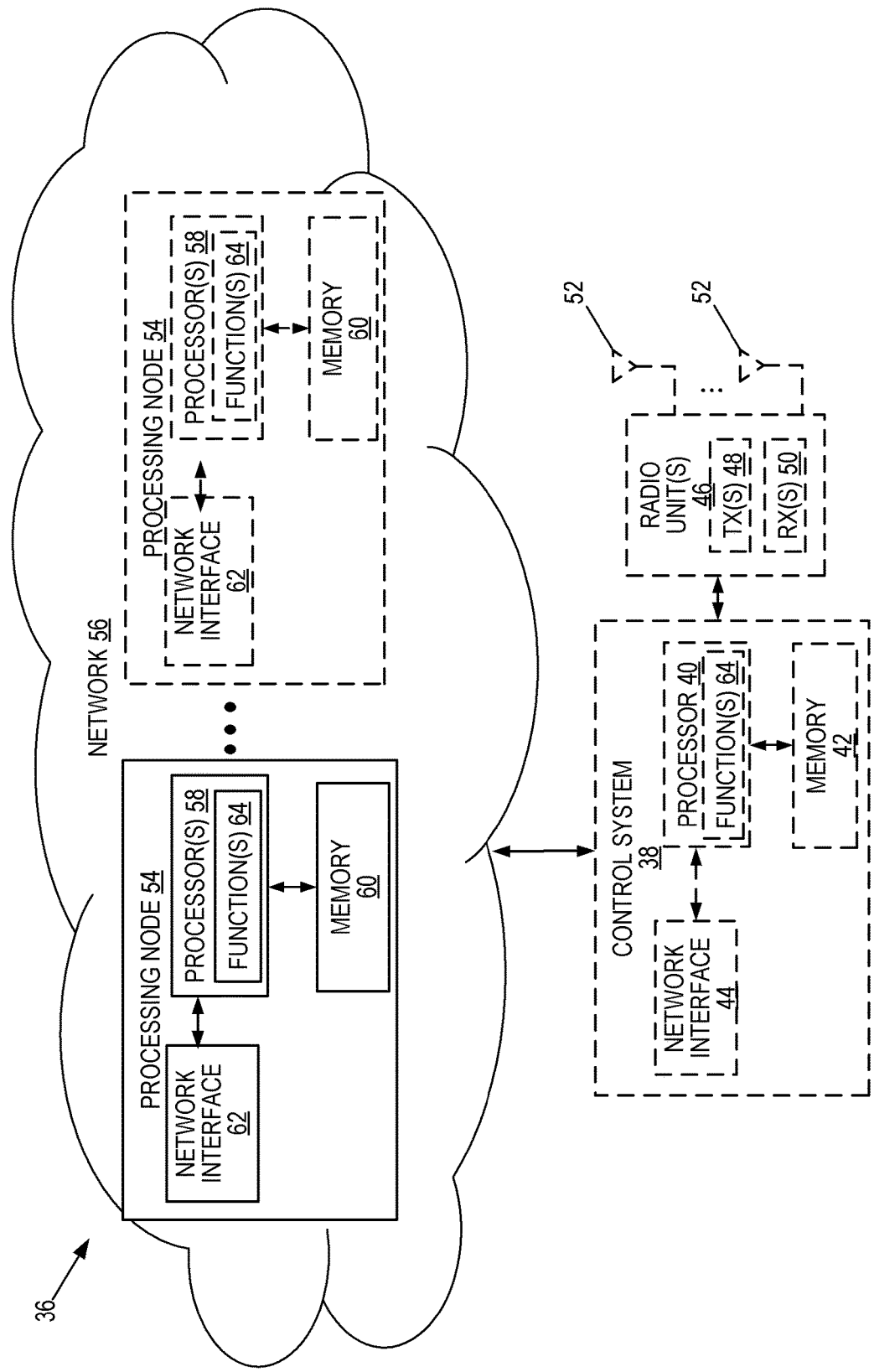
FIG. 10 is a schematic block diagram of a virtualized network node/function according to some embodiments of the present disclosure.

FIG. 10 is a schematic block diagram that illustrates a virtualized embodiment of the network function 20 (e.g., a radio access function 12 or a network function 20) according to some embodiments of the present disclosure. As used herein, a "virtualized" network function 36 is a network function 36 in which at least a portion of the functionality of the network function 36 is implemented as a virtual component (e.g., via a virtual machine(s) executing on a physical processing node(s) in a network(s)). As illustrated, the network function 36 optionally includes the control system 38, as described with respect to FIG. 9*b*. In addition, if the network function 36 is the radio access network function 12, the network function 36 also includes the one or more radio units 46, as described with respect to FIG. 9*a*. The control system 38 (if present) is connected to one or more processing nodes 54 coupled to or included as part of a network(s) 56 via the network interface 44. Alternatively, if the control system 38 is not present, the one or more radio units 46 (if present) are connected to the one or more processing nodes 54 via a network interface(s). Alternatively, all of the functionality of the network function 36 (e.g., all of the functionality of the radio access network function 12) described herein may be implemented in the processing nodes 54. Each processing node 54 includes one or more processors 58 (e.g., CPUs, ASICs, DSPs, FPGAs, and/or the like), memory 60, and a network interface 62.

In this example, functions 64 of the network function 36 (e.g., the functions of the radio access network function 12) described herein are implemented at the one or more processing nodes 54 or distributed across the control system 38 (if present) and the one or more processing nodes 54 in any desired manner. In some particular embodiments, some or all of the functions 64 of the network function 36 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 (if present) or alternatively the radio unit(s) 46 (if present) is used in order to carry out at least some of the desired functions. Notably, in some embodiments, the control system 38 may not be included, in which case the radio unit(s) 46 (if present) communicates directly with the processing node(s) 54 via an appropriate network interface(s).

FIG. 11*a* is a schematic block diagram of a wireless communication device 14 according to some embodiments of the present disclosure. As illustrated, the wireless communication device 14 includes processing circuitry 40 comprising one or more processors 42 (e.g., CPUs, ASICs, FPGAs, DSPs, and/or the like) and memory 44. The UE 14 also includes one or more transceivers 46 each including one or more transmitters 48 and one or more receivers 50 coupled to one or more antennas 52. In some embodiments, the functionality of the wireless communication device 14 described above may be implemented in hardware (e.g., via hardware within the circuitry 40 and/or within the processor(s) 42) or be implemented in a combination of hardware and software (e.g., fully or partially implemented in software that is, e.g., stored in the memory 44 and executed by the processor(s) 42).

In some embodiments, a computer program including instructions which, when executed by the at least one processor 42, causes the at least one processor 42 to carry out at least some of the functionality of the wireless communication device 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

FIG. 11*b* is a schematic block diagram of a wireless communication device 14 according to some other embodiments of the present disclosure. The UE 14 includes one or more modules 54, each of which is implemented in software. The module(s) 54 provide the functionality of the wireless communication device 14 described herein.

Some embodiments described above can be summarised in the following manner:

One embodiment is directed to a method for selecting a core Network Slice (NS) for serving a Wireless Communication Device (WCD) 530 in a core network 500. The core network 500 comprises at least one a Management Function (MF) entity 530 serving the WCD 530 and at least one Repository Function (RF) entity NRF1, NRF2 serving a plurality of core NSs that comprises a plurality of Network Function (NF) entities. The method is performed by a Slice Selection Function (SSF) entity 510 operative in the core network 500. The method comprises:

obtaining NSI running status information that indicates NSI running status for each NS to be monitored;

receiving a NSI selection request comprising NSI selection information indicating at least one of NS for serving the WCD 530;

selecting, based on the NSI selection information and the NSI running status information, a selected NS for serving the WCD 530.

The obtaining may comprise:

sending a NSI monitoring request towards each RF that serves at least one NS to be monitored, which request indicates the NSs to be monitored by the particular RF;

receiving a NSI monitoring response originating from each RF serving at least one NS to be monitored, which NSI monitoring response comprises NSI information indicating NSI running status for each NS monitored by the particular RF.

The NSI monitoring request may further comprise a NSI monitoring policy indicating how each NS should be monitored by the particular RF.

The method may further comprise: obtaining, from a subscription data management function entity 540 in the core network 500, a slice-monitoring policy indicating at least a part of the NSI monitoring policy for each NSI monitoring request to be sent towards each RF that serves at least one NS to be monitored.

The NSI selection information may comprises at least one of:
- a requested Network Slice Selection Assistance Information (NSSAI), originating from the WCD 530 and indicating one or more requested NS types; or
- a requested Single NSSAI (S-NSSAI) originating from the WCD 530 and indicating at least one requested NS type; or
- a subscribed NSSAI originating from a subscription data management function entity 540 in the core network 500 and indicating one or more subscribed NS types; or
- a subscribed S-NSSAI originating from the subscription data management function entity 540 and indicating at least one requested NS type.

The method may further comprise: sending towards the MF 520 serving the WCD 530, a NSI selection response comprising NSI selection information indicating a selected NS for serving the WCD 530.

Another embodiment is directed towards a Slice Selection Function (SSF) entity 510 configured to operatively select a core Network Slice (NS) for serving a wireless communication device (WCD) 530 in a core network (500). The core network 500 comprises at least one a Management Function (MF) entity 530 for serving the WCD 530 and at least one Repository Function (RF) entity for serving a plurality of core NSs that each comprises a plurality of Network Function (NF) entities. The SSF entity 510 comprises at least one processor 24 and memory 26 comprising instructions executable by the at least one processor 24 whereby the SSF entity 500 is operable to:
- obtain NSI running status information indicating NSI running status for each NS to be monitored;
- receive a NSI selection request comprising NSI selection information indicating at least one of NS for serving the WCD (530);
- select, based on the NSI selection information and the NSI running status information, a selected NS for serving the WCD.

The NSI running status information may be obtained by the SSF entity 500 being operable to:
- send a NSI monitoring request towards each RF that serves at least one NS to be monitored, which request indicates the NSs to be monitored by the particular RF;
- receive a NSI monitoring response originating from each RF serving at least one NS to be monitored, which NSI monitoring response comprises NSI information indicating NSI running status for each NS monitored by the particular RF.

The NSI monitoring request may further comprise a NSI monitoring policy indicating how each NS should be monitored by the particular RF.

The SSF entity 500 may be is further operable to:
obtain, from a subscription data management function entity 540 in the core network 500, a slice-monitoring policy indicating at least a part of the NSI monitoring policy for each NSI monitoring request to be sent towards each RF that serves at least one NS to be monitored.

The NSI-selection information may comprise at least one of:
- a requested Network Slice Selection Assistance Information (NSSAI) originating from the WCD 530 and indicating one or more requested NS types; or
- a requested Single NSSAI (S-NSSAI) originating from the WCD 530 and indicating at least one requested NS type; or
- a subscribed NSSAI originating from a subscription data management function entity 540 in the core network 500 and indicating one or more subscribed NS types; or
- a subscribed S-NSSAI originating from the subscription data management function entity 540 and indicating at least one requested NS type.

The SSF entity 500 may be further operable to:
send, towards the MF 520 serving the WCD 530, a NSI selection response comprising NSI selection information indicating a selected NS for serving the WCD.

Another embodiment is directed towards a method for selecting a core Network Slice (NS) for serving a wireless communication device (WCD) 530 in a core network 500 that comprises a plurality of core NSs, that each comprises a plurality of Network Function (NF) entities. The method is performed by a Management Function (MF) entity 530 operative in the core network 500. The method comprises:
- receiving a registration request originating from the WCD 530, which registration request comprises requested NSI-selection information indicating one or more requested NSIs for serving the WCD 530;
- sending a NSI-selection request towards a Slice Selection Function (SSF) entity 510, which NSI-selection request comprises NSI selection information indicating at least one NS for serving the WCD 530;
- receiving a NSI-selection response comprising NSI-selection information indicating a selected NS for serving the WCD 530.

Another embodiment is directed towards a Management Function (MF) entity 530 configured to operatively select a core Network Slice (NS) for serving a wireless communication device (WCD) 530 in a core network 500 that comprises a plurality of core NSs, that each comprises a plurality of Network Function (NF) entities. The MF entity 530 comprises at least one processor 24 and memory 26 comprising instructions executable by the at least one processor 24 whereby the MF entity 500 is operable to:
- receive a registration request originating from the WCD 530, which registration request comprises requested NSI-selection information indicating one or more requested NSIs for serving the WCD 530;
- send a NSI-selection request towards a Slice Selection Function (SSF) entity 510, which NSI-selection request comprises NSI selection information indicating at least one NS for serving the WCD 530;
- receive a NSI selection response comprising NSI selection information indicating a selected NS for serving the WCD 530.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for selecting a core network slice (NS) for serving a wireless communication device (WCD) in a core network; the core network comprising at least one Management Function (MF) entity serving the WCD and at least one Repository Function (RF) entity serving a plurality of core network slices NSs, each NS comprising a plurality of Network Function (NF) entities; the method comprising a Slice Selection Function (SSF) entity operative in the core network:
    obtaining Network Slice Instance (NSI) running status information indicating NSI running status for each NS to be monitored, wherein obtaining the NSI running status information comprises:

sending an NSI monitoring request towards each RF that serves at least one NS to be monitored, the NSI monitoring request indicating the NSs to be monitored by a particular RF; and receiving, from each RF that received the NSI monitoring request, an NSI monitoring response originating from each RF serving at least one NS to be monitored, the NSI monitoring response comprising NSI information indicating the NSI running status for each NS monitored by the particular RF, and wherein the NSI running status comprises a number of NFs currently instantiated in the NSI and/or a work load status per NF in the NSI;

receiving a NSI selection request comprising NSI selection information indicating at least one NS for serving the WCD; and selecting, based on the NSI selection information and the NSI running status information, a selected NS for serving the WCD.

2. The method of claim 1, wherein the NSI monitoring request further comprises a NSI monitoring policy indicating how each NS should be monitored by the particular RF.

3. The method of claim 2, further comprising:

obtaining, from a subscription data management function entity in the core network, a slice monitoring policy indicating at least a part of the NSI monitoring policy for each NSI monitoring request to be sent towards each RF.

4. The method of claim 1, wherein the NSI selection information comprises at least one of:

a requested Network Slice Selection Assistance Information (NSSAI) originating from the WCD and indicating one or more requested NS types;

a requested Single NSSAI (SNSSAI) originating from the WCD and indicating at least one requested NS type;

a subscribed NSSAI originating from a subscription data management function entity in the core network and indicating one or more subscribed NS types; and a subscribed SNSSAI originating from the subscription data management function entity and indicating at least one requested NS type.

5. The method of claim 1, further comprising sending, towards the MF serving the WCD, an NSI selection response comprising NSI selection information indicating a selected NS for serving the WCD.

6. A Slice Selection Function (SSF) entity configured to operatively select a core network slice (NS) for serving a wireless communication device (WCD) in a core network; the core network comprising at least one Management Function (MF) entity for serving the WCD and at least one Repository Function (RF) entity for serving a plurality of core network slices NSs, each NS comprising a plurality of Network Function (NF) entities; the SSF entity comprising processing circuitry;

memory containing instructions executable by the processing circuitry whereby the SSF entity is operative to:

obtain Network Slice Instance (NSI) running status information indicating NSI running status for each NS to be monitored, wherein to obtain the NSI running status information, the instructions are such that the SSF is operative to:

send an NSI monitoring request towards each RF that serves at least one NS to be monitored, the NSI monitoring request indicating the NSs to be monitored by a particular RF; and receive, from each RF that received the NSI monitoring request, an NSI monitoring response originating from each RF serving at least one NS to be monitored, the NSI monitoring response comprising NSI information indicating NSI running status for each NS monitored by the particular RF, wherein the NSI running status comprises a number of NFs currently instantiated in the NSI and/or a work load status per NF in the NSI;

receive a NSI selection request comprising NSI selection information indicating at least one NS for serving the WCD; and select, based on the NSI selection information and the NSI running status information, a selected NS for serving the WCD.

7. The SSF entity of claim 6, wherein the NSI monitoring request further comprises a NSI monitoring policy indicating how each NS should be monitored by the particular RF.

8. The SSF entity of claim 7, wherein the instructions are such that the SSF is operative to obtain, from a subscription data management function entity in the core network, a slice monitoring policy indicating at least a part of the NSI monitoring policy for each NSI monitoring request to be sent towards each RF.

9. The SSF entity of claim 6, wherein the NSI selection information comprises at least one of:

a requested Network Slice Selection Assistance Information (NSSAI) originating from the WCD and indicating one or more requested NS types;

a requested Single NSSAI (SNSSAI) originating from the WCD and indicating at least one requested NS type;

a subscribed NSSAI originating from a subscription data management function entity in the core network and indicating one or more subscribed NS types; and a subscribed SNSSAI originating from the subscription data management function entity and indicating at least one requested NS type.

10. The SSF entity of claim 9, wherein the instructions are such that the SSF is operative to send, towards the MF serving the WCD, an NSI selection response comprising NSI selection information indicating a selected NS for serving the WCD.

* * * * *